(12) United States Patent
Rathinasamy et al.

(10) Patent No.: US 11,509,491 B2
(45) Date of Patent: Nov. 22, 2022

(54) POWER-OVER-ETHERNET (POE) BREAKOUT MODULE

(71) Applicant: DELL PRODUCTS L.P., Round Rock, TX (US)

(72) Inventors: Shree Rathinasamy, Round Rock, TX (US); Robert Neal Beard, Austin, TX (US); Victor Teeter, Round Rock, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 241 days.

(21) Appl. No.: 16/900,967

(22) Filed: Jun. 14, 2020

(65) Prior Publication Data

US 2021/0392006 A1 Dec. 16, 2021

(51) Int. Cl.
*G06F 1/00* (2006.01)
*H04L 12/10* (2006.01)
*G06F 1/26* (2006.01)
*H04L 49/35* (2022.01)
*H04L 49/00* (2022.01)
(Continued)

(52) U.S. Cl.
CPC .............. *H04L 12/10* (2013.01); *G06F 1/266* (2013.01); *H04L 49/30* (2013.01); *H04L 49/35* (2013.01); *H04L 49/40* (2013.01); *G06F 1/3203* (2013.01)

(58) Field of Classification Search
CPC ......... H04L 12/10; H04L 49/30; H04L 49/35; H04L 49/40; G06F 1/266
USPC ....................................................... 713/300
See application file for complete search history.

(56) References Cited

U.S. PATENT DOCUMENTS

2005/0229016 A1* 10/2005 Addy .................. G06F 1/30
  323/205
2009/0083550 A1* 3/2009 Diab ................. H04L 12/10
  713/300
(Continued)

OTHER PUBLICATIONS

"Enable-IT 375 Gigabit Power over Ethernet Injector Quick Start Guide," Enable-IT Ethernet Extension Experts, 2017. (7pgs) [online], [Retrieved Jul. 10, 2022]. Retrieved from Internet <URL: https://enableit.com/wp-content/uploads/2017/07/375-Manual.pdf.
(Continued)

*Primary Examiner* — Volvick Derose
(74) *Attorney, Agent, or Firm* — North Weber & Baugh LLP

(57) ABSTRACT

Presented herein are embodiments of a power-over-Ethernet (PoE) breakout system that may be used to breakout a PoE port from a PoE information handling system into a number of breakout ports. In one or more embodiments, a PoE breakout system comprises: a PoE port for connecting to a PoE information handling system, such as a PoE switch; a plurality of breakout ports for connecting to powered devices, wherein each breakout port is configured to supply power to a powered device; and a power management module electrically coupled to the PoE port and configured to supply power to each breakout port according to a configuration that sets a power level for that breakout port. In one or more embodiments. the PoE breakout system comprises a data communications module that switches data traffic to a correct PoE breakout port according to its intended powered device.

20 Claims, 10 Drawing Sheets

(51) Int. Cl.
*H04L 49/40* (2022.01)
*G06F 1/3203* (2019.01)

(56) References Cited

U.S. PATENT DOCUMENTS

| | | | | |
|---|---|---|---|---|
| 2012/0319468 | A1* | 12/2012 | Schneider | H04L 12/10 307/1 |
| 2014/0292070 | A1* | 10/2014 | Poh | H04L 12/40045 307/23 |
| 2019/0182056 | A1* | 6/2019 | Ramanujam | H04L 12/10 |
| 2019/0199536 | A1* | 6/2019 | Kurk | G06F 1/26 |
| 2020/0371572 | A1* | 11/2020 | Plank | H04L 12/40045 |
| 2021/0006420 | A1* | 1/2021 | Neyland | G06F 1/3296 |
| 2021/0320462 | A1* | 10/2021 | Scherer | H01R 13/703 |
| 2021/0392006 | A1* | 12/2021 | Rathinasamy | H04L 12/10 |

OTHER PUBLICATIONS

VERSA Technology,"VX-Pi100" IEEE 802.3af Compatible Power over Ethernet PoE Injector. (3 pgs).

* cited by examiner

POWER-OVER-ETHERNET (POE) BREAKOUT MODULE

BACKGROUND

The present disclosure relates generally to information handling system. More particularly, the present disclosure relates to supplying power-over-Ethernet (POE).

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Power-over-Ethernet (PoE) provides a convenient method to power devices, such as Internet Protocol (IP) phone, IP camera, wireless access points (WAP), lighting, and other devices. Using POE connections provides a great alternative to using a dedicated power outlet and power cable for each device. Even though PoE switches conveniently supply power to powered devices (PDs), there are some problems associated with it.

First, the use of power cables and power outlets are merely transferred from the powered devices to the PoE switches, keeping the same number of cables and outlets used, but in the form of data cables and switch ports. Second, the number of PoE switches/switch ports required is in direct correlation to the number of PDs, regardless of the proximity or vicinity. FIG. 1 depicts an illustration of this problem.

FIG. 1 depicts a PoE switch supplying power or power and data to a number of remote powered devices. Depicted is a Power over Ethernet switch 105 that is supplying power to a number of powered devices. Note that cables need to be run from the PoE switch to each of the power devices. Thus, each power device needs to have its own corresponding connection to the PoE switch, which can be costly and difficult to do as the cables 120 often are run through wall, in ceilings, and/or under floor 125. Besides requiring numerous cables to be run from the PoE switch to the power devices, each device requires its own port connection at the PoE switch 105. Thus, as shown in FIG. 1, for a room 115 that has 12 devices (i.e., devices 140-151), a PoE switch with 24 ports can only support two rooms. This one-to-one port requirement, therefore, increases device costs.

In addition to material costs (e.g., PoE switches and cables) and installation costs (e.g. costs of purchasing and running cables for each device), there are other expenses. For example, administrative tasks and operations for the network administrator increases as the number of PoE switches increase. Also, there are increased administrative burdens cause by configuration and user errors. Given the large number of cables and the long runs of cable, tracing cables from a PoE switch to a powered device can be extremely time consuming and costly. Similarly, fixing cable issues, such as replacing defective cables, is also very time consuming and costly. Finally, as device counts grow, more PoE switches are required thereby increasing the costs of purchasing and installing PoE switches for local power and data. And, there tends to be a lack of or minimal centralized management available for PoE switches, which makes managing more costly as there counts grow.

Accordingly, what is needed are better mechanisms for supply power or power and data to powered devices.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
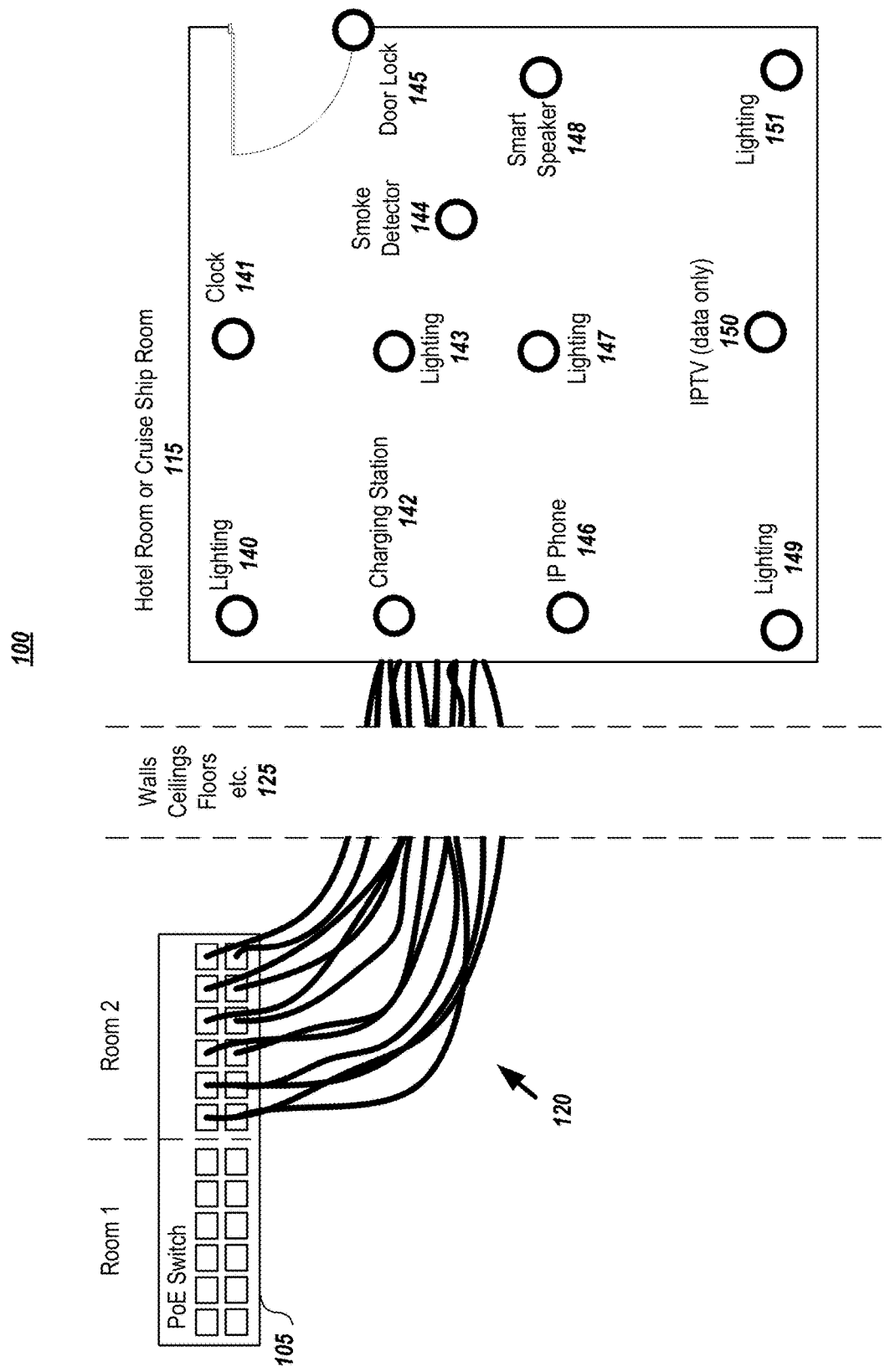
FIG. 1 ("FIG. 1") depicts a PoE switch supplying power or power and data to a number of remote powered devices.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

A. General Introduction

At address the issues created by current implementations, embodiments herein comprise a PoE breakout module that supports the breakout of a switch port into a number of breakout ports. FIG. 2 illustrates a network, similar to that in FIG. 1, but that employs a number of PoE breakout modules, according to embodiments of the present disclosure.

Figure 2:
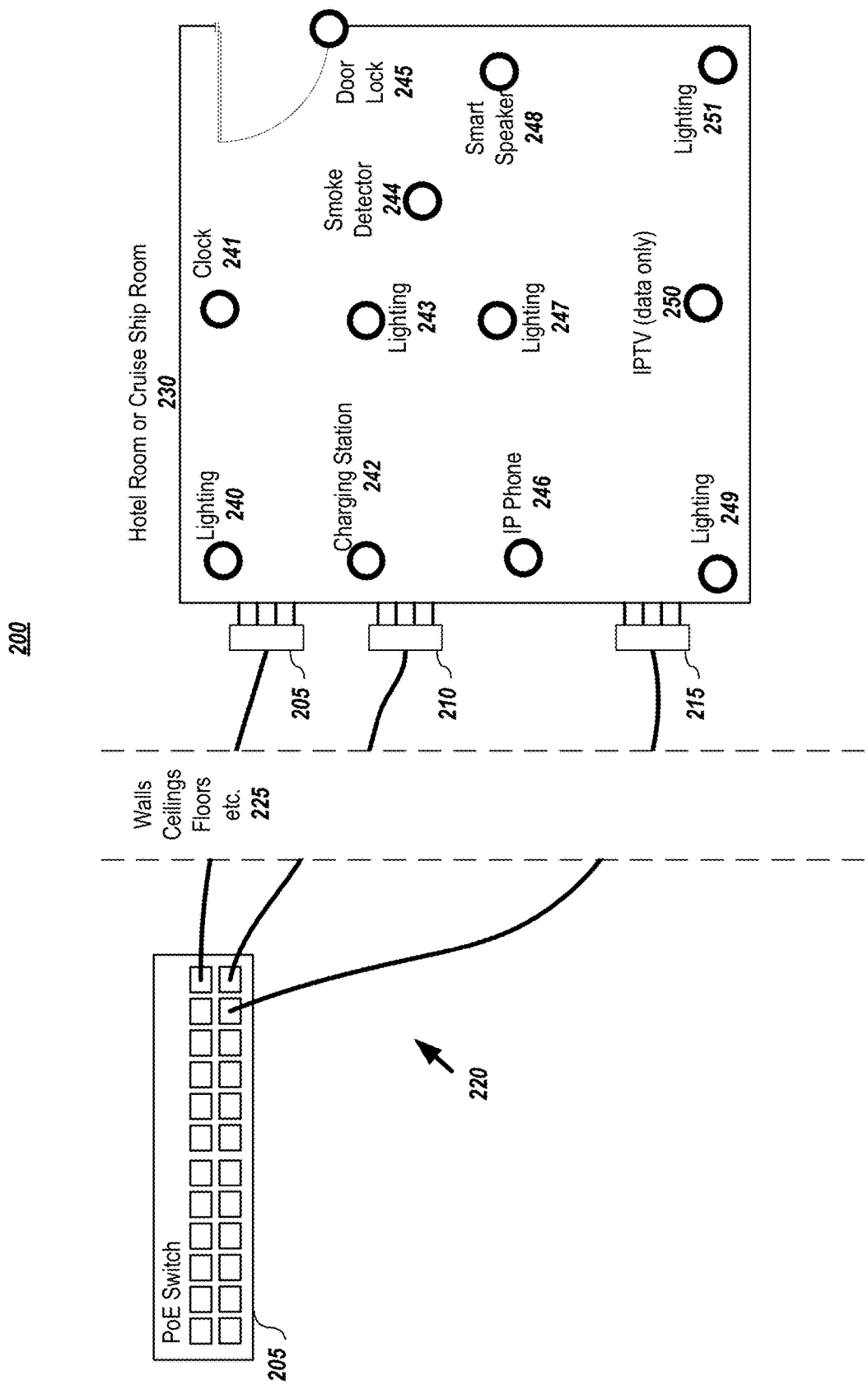
FIG. 2 illustrates a network, similar to that in FIG. 1, but that employs a number of PoE breakout modules, according to embodiments of the present disclosure.

Illustrated in FIG. 2 is a PoE switch 205 that supports twelve powered devices (240-251), just like the PoE switch 105 in FIG. 1, however, three PoE breakout modules (205, 210, and 215) are being used. In the depicted example, the breakout modules 205, 210, and 215 each breakout into four ports, although it shall be noted that a different number of breakout ports may be supported. Note that, given the use of the breakout modules, only three ports are used on the PoE switch 205 rather than the 12 ports that were used in FIG. 1. As a result, a number of the benefits are achieved. For example, there are fewer cables 220 that need to be run from the PoE switch 205 to the power devices 240-251; there is less configuring required for the PoE switch; and there are fewer PoE switches needed.

It shall be noted that the PoE breakout module is unlike existing approaches that use injectors or splitters. For example, PoE midspan injectors are used to boost power in a long span. However, such devices require their own external power source, like a wall plug, to supply the power used for boosting. One or more embodiments of the PoE breakout module do not use separate external power source. Thus, such embodiments of the PoE breakout module can be deployed in more places, such as places where separate power sources are not readily available. Also, because they do not utilize power supplies that are plugged into external power sources, they can have smaller form factors and can be made with fewer components. Also, PoE injectors have no or very limited data networking capability. Like PoE injectors, PoE splitters also require external power.

Consider a cruise ship or hotel room that needs to power 12 powered devices in a single suite using a PoE switch. Using traditional approaches, it would take three 8-port PoE switches to power two suites and would require running 24 separate copper cables and port configurations for each PD. However, using PoE breakout modules, one 8-port PoE switch (instead of three 8-port PoE switches) could support the same two suites and still have two available ports—assuming a 1-to-4 PoE breakout module. Furthermore, only six separate cables would be run—rather than 24 cables. Also, if PoE injectors or splitter were used, they would need their own power source, which may not be available, and in cases like cruise ships, where space and external power sources are limited, using such devices is impractical or impossible.

Consider, also, a case of powering light emitting diode (LED) lights for lighting. Using such lighting typically involves design considerations, such as power draw, length of cable for each LED powered device, etc. Typically, this involves either buying cables of varying length (for example, a 10-foot cable for a powered device nine feet away and 30-foot cable for a powered device 30 feet away) or buying cables of same length without distance consideration for each powered device (for example, using 40-foot cables for each powered device whether it is 10-feet away or 35-feet away). If a PoE switch with PoE breakout modules was used instead (which can also accommodate increased power draw needed for each breakout port), a long breakout cable may be run closer to the collection of the LED powered devices, such as a small hallway or a conference room. The breakouts may then be connected to the powered devices easily, without the hassle of running individual cables of varying length, tracing them to each port, etc.

Thus, using a PoE breakout module that comprise a PoE controller or controllers that support the breakout for a PoE switch port provides at least the following advantages: (1) the number of copper cables connecting to switch port decreases, since a single cable, in conjunction with a PoE breakout module, can power several powered devices; (2) the number of PoE switches need to power powered devices decreases; (3) administrative tasks and operations for the network administrator decreases since the number of switches that are managed decreases; (4) installation costs are decreased since fewer cables are used, and fewer cables are run; (5) decreased administrative burden results in fewer configuration errors; (6) lack of or minimal centralized management available for PoE switches is less of a problem, since few PoE switches are used; (7) tracing cables from PoE switch to the powered devices is easier; (8) fixing cable issues such as replacing defective cables is easier; and (9) provides flexibility in breakout lengths for powered devices. One skilled in the art shall recognize other benefits.

B. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more disk drives, one or more network ports for communicating with external devices as well as various input and output (I/O) devices, such as a keyboard, mouse, stylus, touchscreen, and/or video display. The computing system may also include one or more buses operable to transmit communications between the various hardware components.

Figure 3:
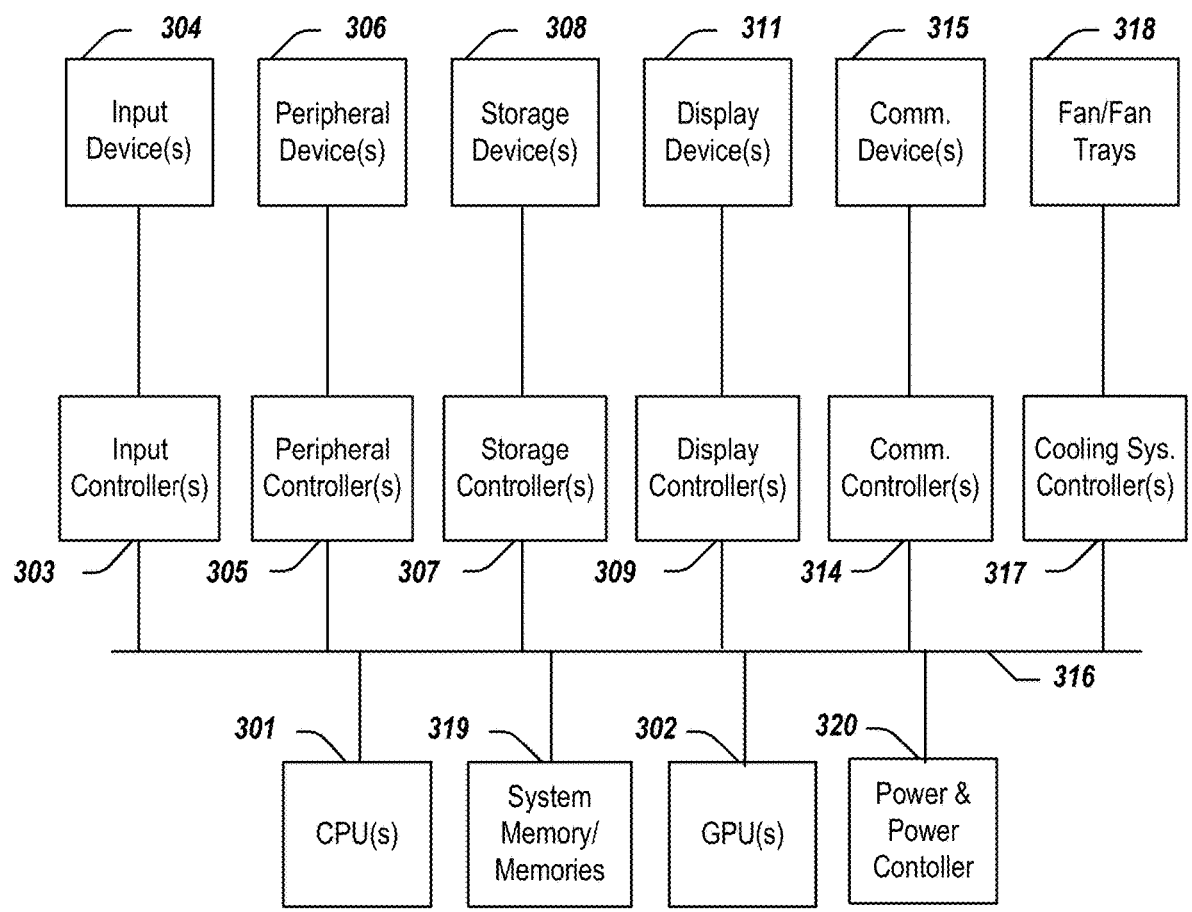
FIG. 3 depicts a simplified block diagram of an information handling system (or computing system), according to embodiments of the present disclosure.

FIG. 3 depicts a simplified block diagram of an information handling system (or computing system), according to embodiments of the present disclosure. It will be understood that the functionalities shown for system 300 may operate to support various embodiments of a computing system—although it shall be understood that a computing system may be differently configured and include different components, including having fewer or more components as depicted in FIG. 3.

As illustrated in FIG. 3, the computing system 300 includes one or more central processing units (CPU) 301 that provides computing resources and controls the computer. CPU 301 may be implemented with a microprocessor or the like and may also include one or more graphics processing units (GPU) 302 and/or a floating-point coprocessor for mathematical computations. In one or more embodiments, one or more GPUs 302 may be incorporated within the display controller 309, such as part of a graphics card or cards. The system 300 may also include a system memory 319, which may comprise RAM, ROM, or both.

A number of controllers and peripheral devices may also be provided, as shown in FIG. 3. An input controller 303 represents an interface to various input device(s) 304, such as a keyboard, mouse, touchscreen, and/or stylus. The computing system 300 may also include a storage controller 307 for interfacing with one or more storage devices 308 each of which includes a storage medium such as magnetic tape or disk, or an optical medium that might be used to record programs of instructions for operating systems, utilities, and applications, which may include embodiments of programs that implement various aspects of the present disclosure. Storage device(s) 308 may also be used to store processed data or data to be processed in accordance with the disclosure. The system 300 may also include a display controller 309 for providing an interface to a display device 311, which may be a cathode ray tube (CRT) display, a thin film transistor (TFT) display, organic light-emitting diode, electroluminescent panel, plasma panel, or any other type of display. The computing system 300 may also include one or more peripheral controllers or interfaces 305 for one or more peripherals 306. Examples of peripherals may include one or more printers, scanners, input devices, output devices, sensors, and the like. A communications controller 314 may interface with one or more communication devices 315, which enables the system 300 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 300 comprises one or more fans or fan trays 318 and a cooling subsystem controller or controllers 317 that monitors thermal temperature(s) of the system 300 (or components thereof) and operates the fans/fan trays 318 to help regulate the temperature.

Also depicted is a power supply and power management controller 320. The power module 320 receives power input, such as from a wall outlet, and converts it for use for the system 300. In one or more embodiments, the power module 320 also include a power controller for supporting power to one or more of the ports of the information handling system 300.

In the illustrated system, all major system components may connect to a bus 316, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 4:
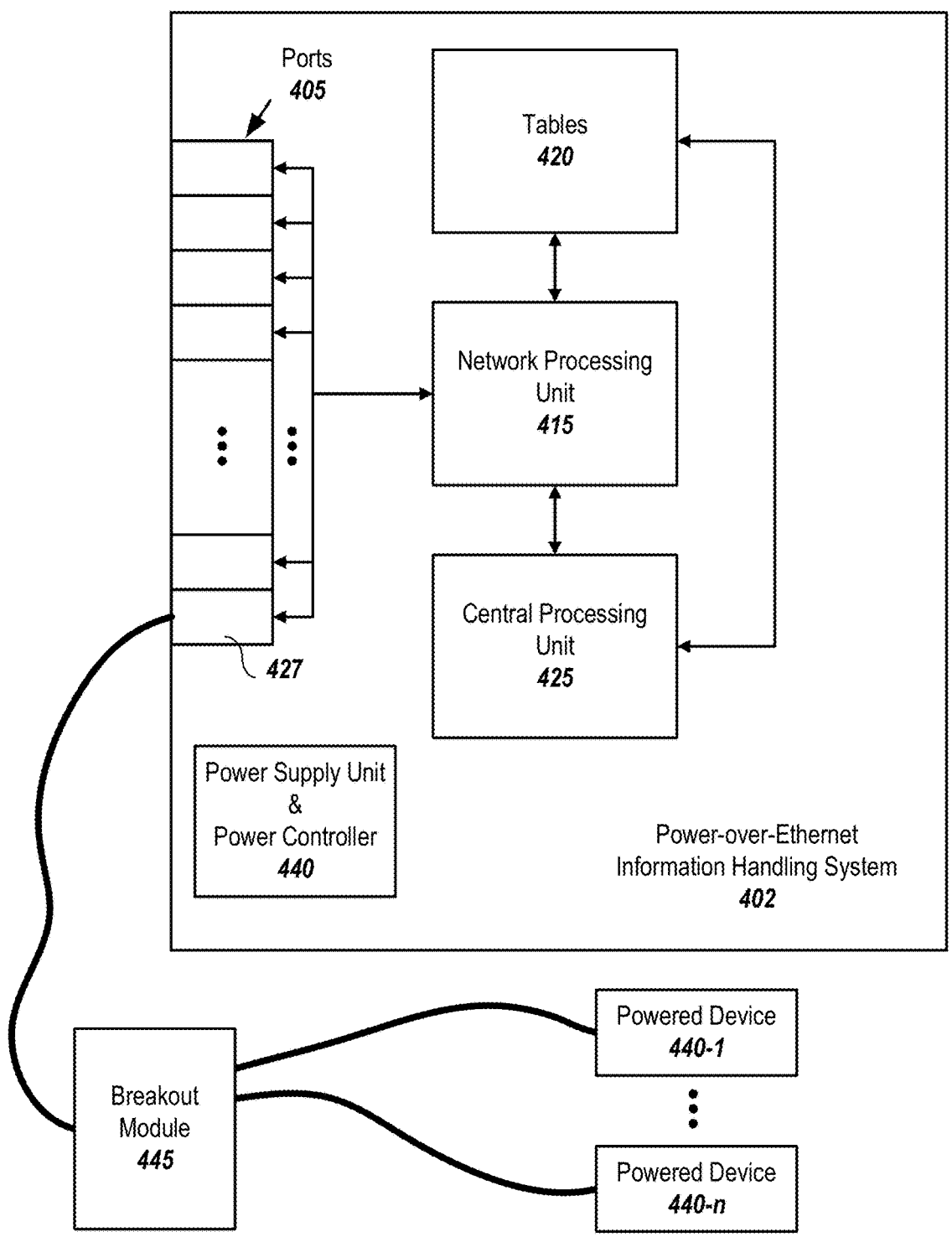
FIG. 4 depicts an alternative block diagram of an information handling system, according to embodiments of the present disclosure.

FIG. 4 depicts an alternative block diagram 402 of an information handling system, according to embodiments of the present disclosure. It will be understood that the functionalities shown for system 400 may operate to support various embodiments of the present disclosure—although it shall be understood that such system may be differently configured and include different components, additional components, or fewer components. In one or more embodiments, the information handling system 402 may be a PoE switch.

The information handling system 402 may include a plurality of I/O ports 405, a network processing unit (NPU) 415, one or more tables 420, and a central processing unit (CPU) 425. The system includes a power supply (not shown) and may also include other components, which are not shown for sake of simplicity.

In one or more embodiments, the I/O ports 405 may be connected via one or more cables to one or more other network devices or clients. The network processing unit 415 may use information included in the network data received at the node 400, as well as information stored in the tables 420, to identify a next device for the network data, among other possible activities. In one or more embodiments, a switching fabric may then schedule the network data for propagation through the node to an egress port for transmission to the next destination.

In one or more embodiments, the PoE information handling system 402 includes a power supply and power management controller 440. The power module 440 receives power input, such as from a wall outlet, and converts it for use for the system 402. In one or more embodiments, the power module 440 also include a power controller for supporting PoE for the ports.

Also depicted in FIG. 4 is a breakout module 445 connected to the PoE information handling system 402 via a PoE port 427. In one or more embodiments, the PoE port 427 may be configured in a strict mode in which a maximum power level (or wattage) is provided to the port. In this way, the breakout module 445 has its maximum ability to supply power to one or more powered devices (e.g., powered devices 440-1 through 440-n).

Figure 5:
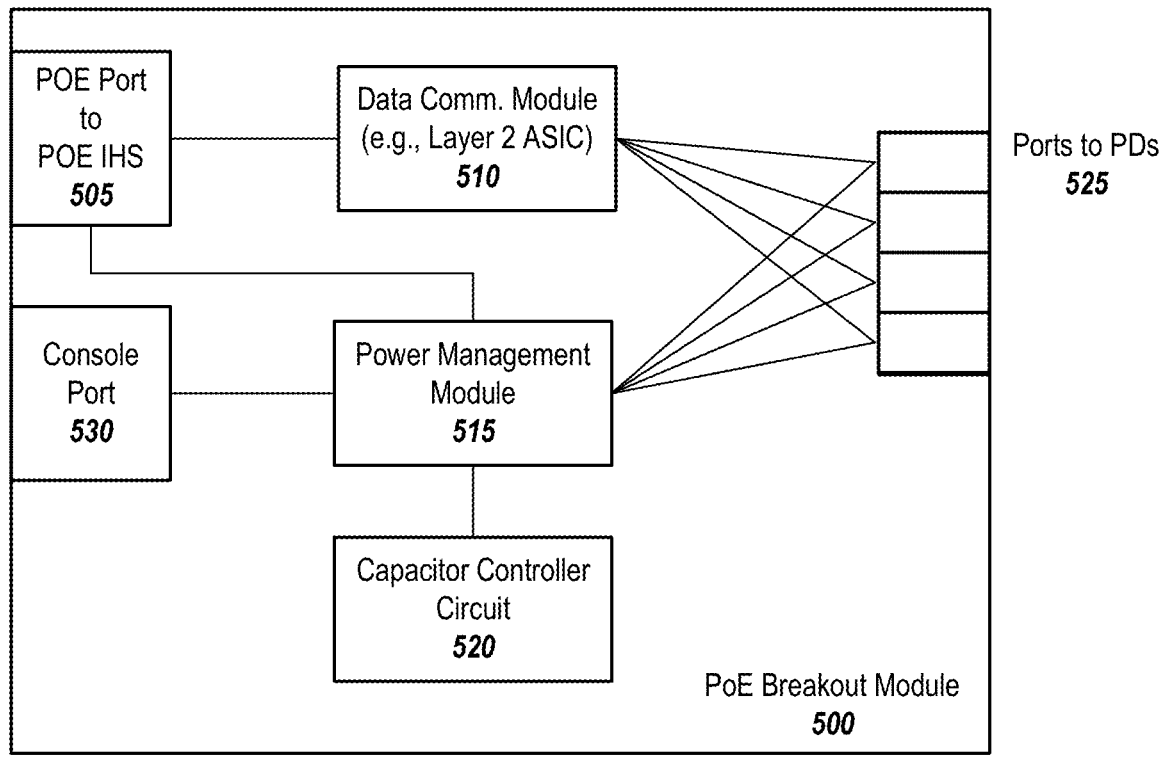
FIG. 5 depicts a block diagram of PoE breakout module, according to embodiments of the present disclosure.

FIG. 5 depicts a block diagram 500 of PoE breakout module, according to embodiments of the present disclosure. In one or more embodiments, a PoE breakout module 500 comprises a PoE port 505 for connecting to a PoE information handling system (e.g., a PoE switch). The PoE port 505 may be a typical RJ45 port that receives a mating cable, such as an RJ45 cable, in which 4 wires are designated for data and 4 wires are designated for power.

In one or more embodiments, the data communications module 510 performs networking functions from management of the Ethernet data channels. For example, the data communications module may use network address translation (NAT) to coordination routing of data traffic between one or more powered devices and the PoE switch.

Figure 6:
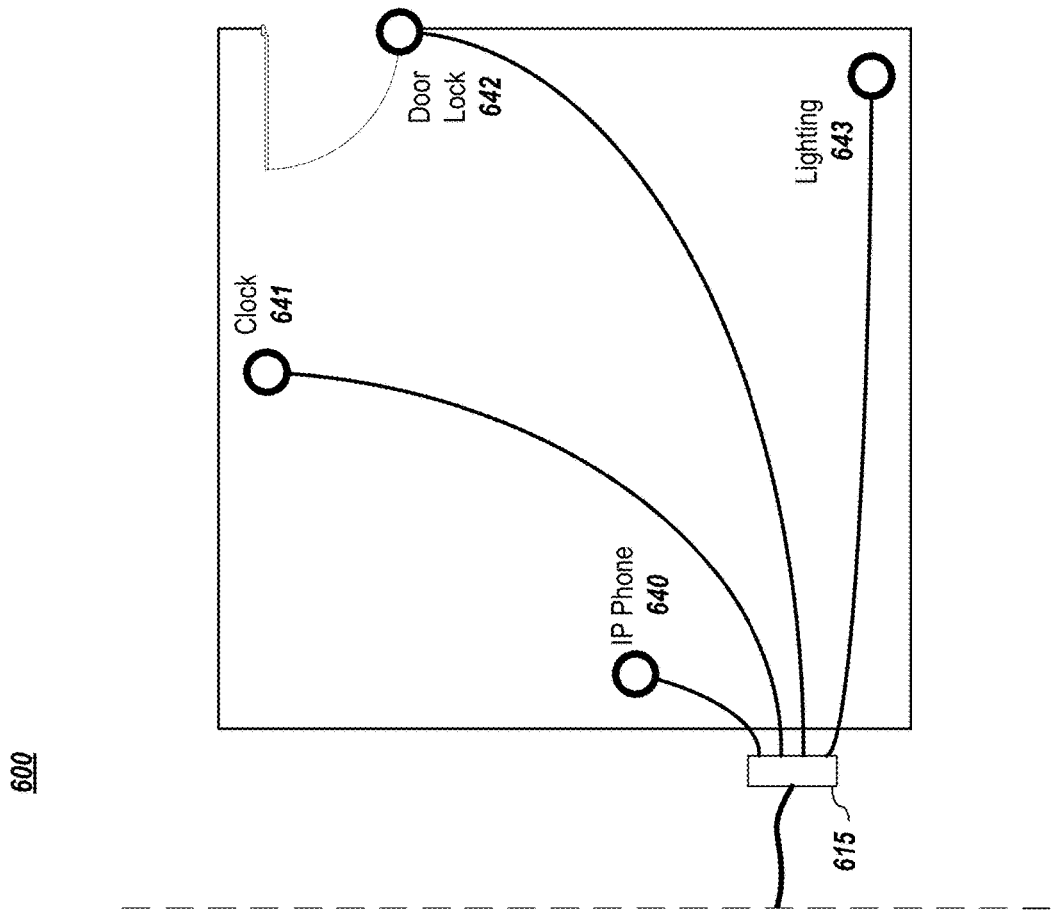
FIG. 6 depicts an example deployment using a PoE breakout system, according to embodiments of the present disclosure.
Figure 6:
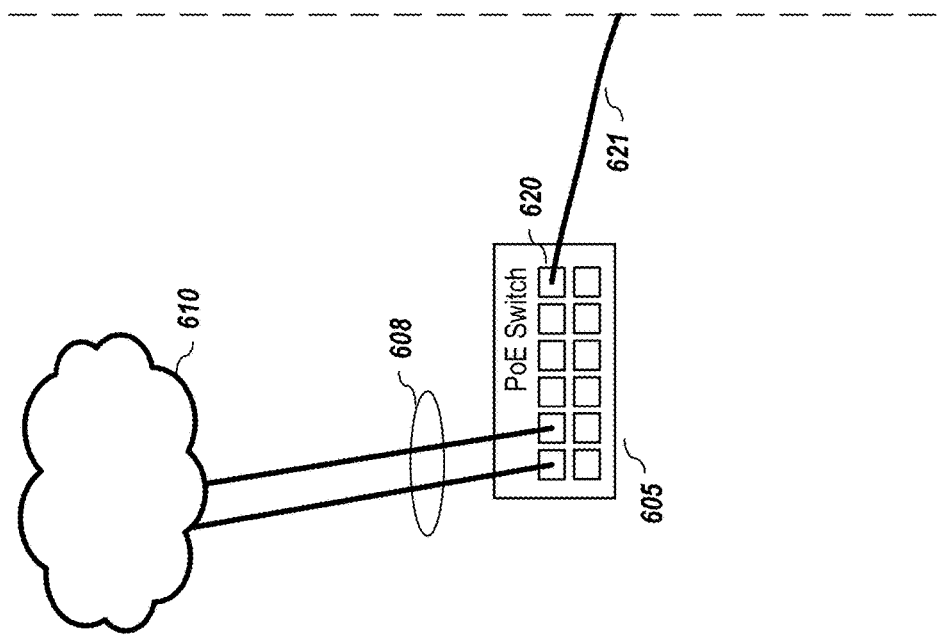

FIG. 6 depicts an example deployment using a PoE breakout system, according to embodiments of the present disclosure. As depicted, a PoE breakout system 615 is used to breakout one PoE port 620 of a PoE switch 605 into four channels for four powered devices 640-643. Note that only one cable 621 needs to be run to the location of the powered devices rather than four, as currently done. In the depicted example, the PoE switch 605 is connected via a link aggregation group (LAG) connection 608 to a network, such as the Internet. For powered devices that may send and/or receive data, the PoE breakout system 615 will switch received data traffic to the appropriate powered device and will send data traffic to the PoE switch, which may route the traffic toward its final destination. Note that, in one or more embodiments, a powered device, such as the LED light 643 may not utilize the data communications functionality of the PoE breakout module 615—although there are LED light systems that send data to and receive data from a management system.

In one or more embodiments, coupled to the PoE port 505 is a power management module (or PoE controller) 515 and a data communication module 510 (e.g., a layer 2 ASIC) that negotiates up to the maximum wattage a PoE switch port can provide. In one or more embodiments, the power management module receive power from a PoE switch via the PoE port 505 and uses the power to power both the PoE breakout module 500 and uses the remaining received power to supply power via one or more ports 525 to one or more powered devices. For example, the PoE breakout module 500 may receive 90 watts from a PoE switch, in which 15 watts is used to power the module 500 and the remaining power is available to power one or more powered devices. In one or more embodiments, the power management module includes or work in conjunction with logic that assigns a configuration power level to a port.

In one or more embodiments, the PoE breakout module 500 may include a capacitor controller circuit 520 to help provide power leveling. Given that power usage may fluctuate, particularly as powered devices are added and removed, the power management module may utilize the capacitor controller circuitry 520 to help keep supplied power amounts with certain tolerances.

It shall be noted that a configuration used by the power management module which sets a power level for a port may be defined or set in any of number of ways.

1. Preset Embodiments

In one or more embodiments, the ports 525 for the powered devices may be preset to specific maximum levels. For example, the IEEE 802.3af-2003 PoE standard provides up to 15.4 watts (W) of DC power, the IEEE 802.3at-2009 PoE standard, also known as PoE+ or PoE plus, provides up to 25.5 W of power for Type 2 devices, and the IEEE 802.3bt provides two additional power types: up to 55 W (Type 3) and up to 90-100 W (Type 4). Thus, in one or more embodiments, a certain number of ports may be preset to one or more of the power levels identified in these standards. Each of the preset ports may be labeled with the standard or with the power level that it is configured to provide—thereby indicating to a user which port they should use when plugging in a powered device with a specific power need.

2. User-Defined Embodiments

In one or more embodiments, one or more of the ports 525 for the powered devices may have a configuration set by a user. For example, in or more embodiments, the PoE breakout module 500 may include a console port 530 that allows a user to apply user-specified configurations for one or more of the ports. In one or more embodiments, a user may connect via the console port and use an out-of-band connection (e.g., a remote connection or laptop connection) to specially configure for power settings, Ethernet settings, or both. It shall be noted that, in one or more embodiments, a user may interface with the power management module 515 and/or the data communications module 510 via the PoE port.

3. Dynamically Set Embodiments

Figure 8:
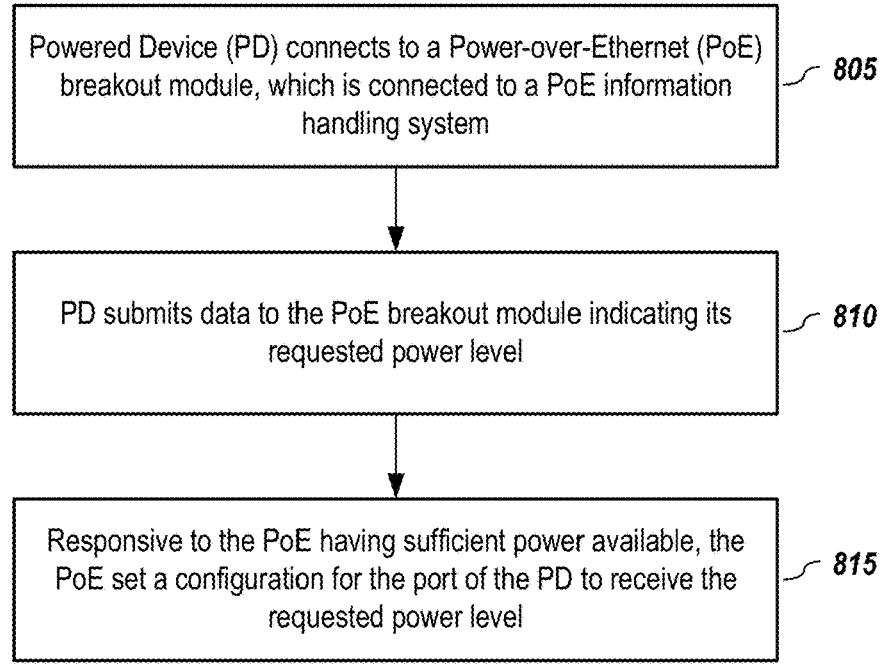
FIG. 8 an example methodology for supplying power to one or more powered devices via a PoE breakout module, according to embodiments of the present disclosure.
Figure 9:
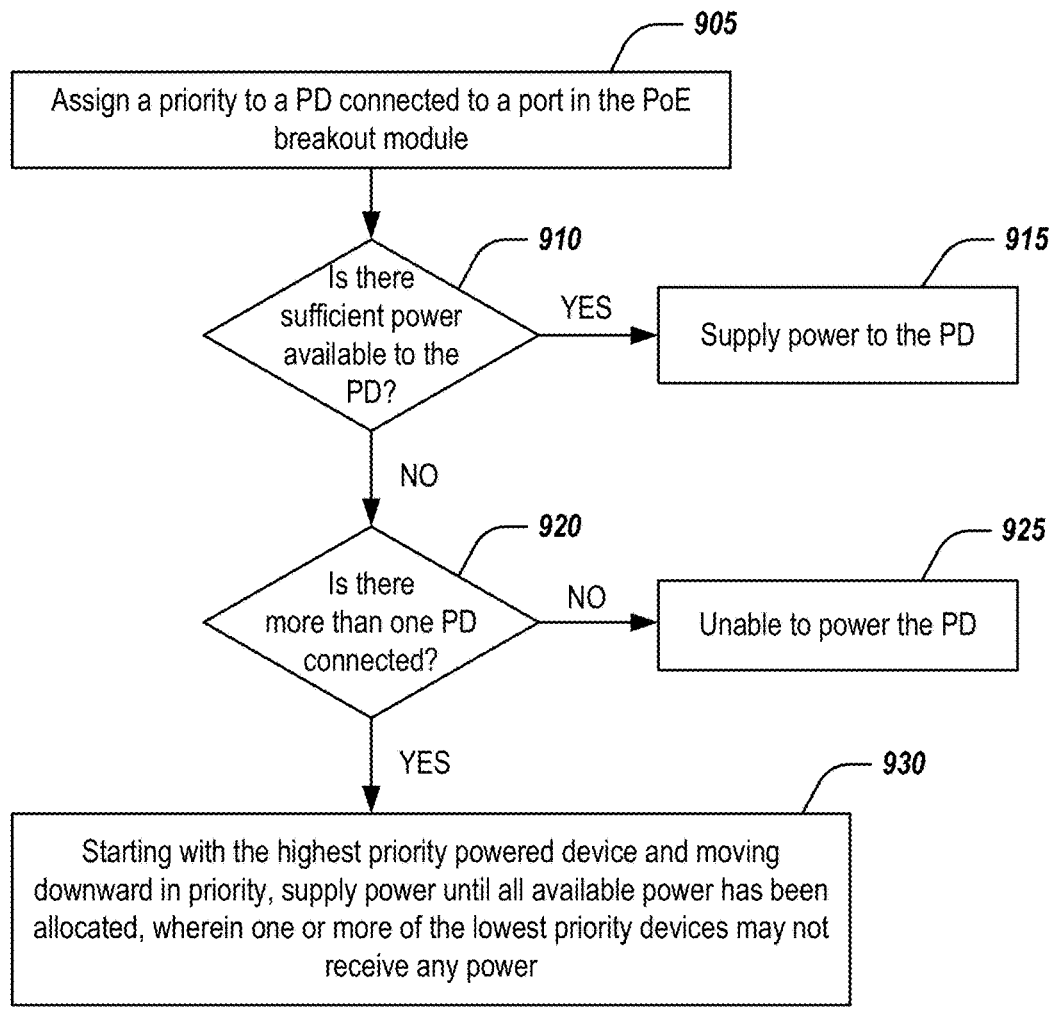
FIG. 9 yet another example methodology for supplying power to one or more powered devices via a PoE breakout module, according to embodiments of the present disclosure.
Figure 10:
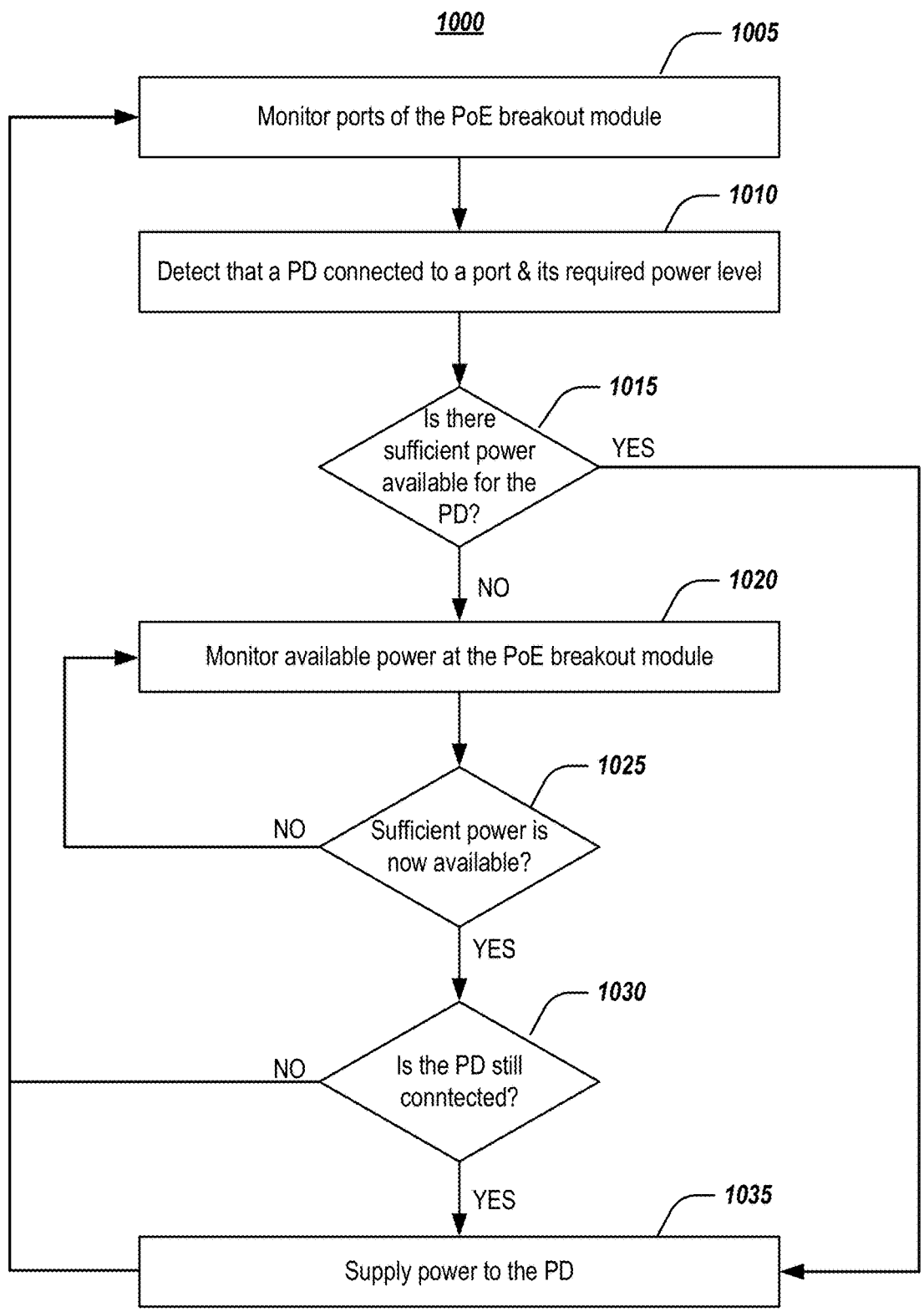
FIG. 10 another example methodology for supplying power to one or more powered devices via a PoE breakout module, according to embodiments of the present disclosure.

In one or more embodiments, one or more of the ports 525 for the powered devices may be dynamically set. For example, as part of its initial communication with the PoE breakout module, a powered device may negotiate with the power management module for a power level that gets set as the configuration for that port while the powered device is connected to that port. In one or more embodiments, in a breakout system with one or more dynamically configured ports, the last device that requests PoE power may not be supplied power if the first devices are consuming up to the limit of the power that the breakout system can provide. FIGS. 8-10 discuss more examples of dynamically setting configurations for power levels.

4. Combination Port Configuration Embodiments

It shall be noted that embodiments may combine any of the aforementioned embodiments. In one or more embodiments, power distribution may be supplied in a breakout system that uses a static port configuration, a dynamic port configuration, or a combination thereof. For example, a certain number of ports may be statically configured to a set power level or levels, some of the other ports may be dynamically configured, and some ports may be user-configurable.

C. Method Embodiments

While some example methodologies were provided above, additional methods are provided, by way of illustration and not limitation, in this section.

Figure 7:
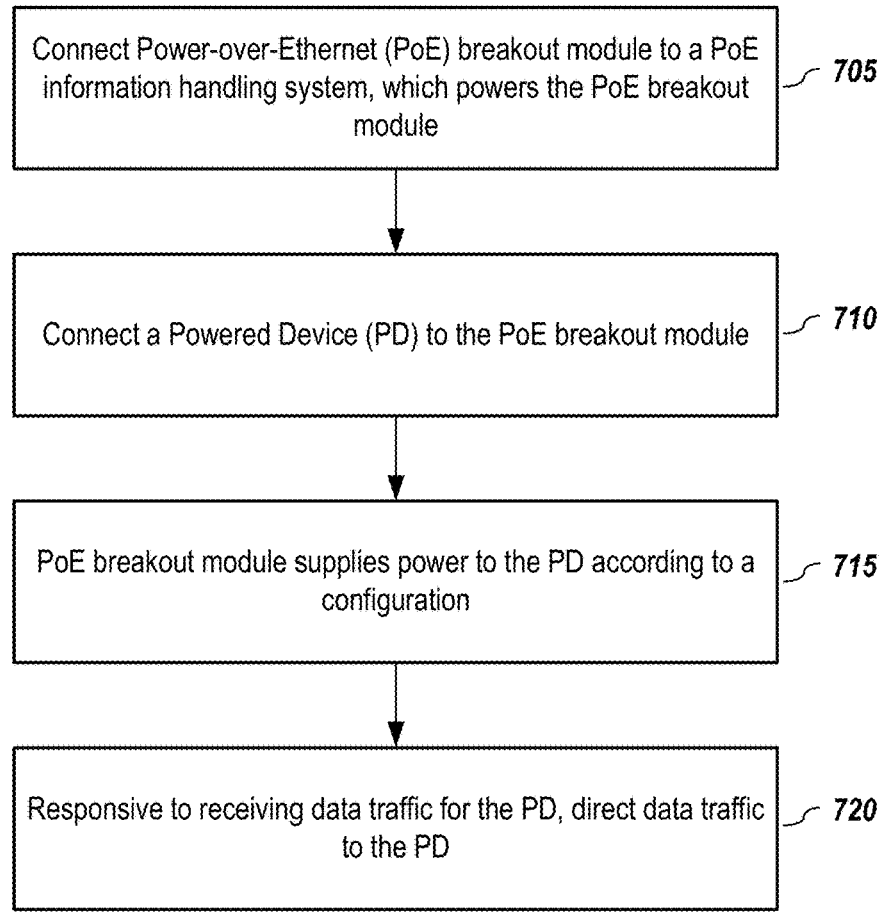
FIG. 7 depicts an overall methodology for using a Power-over-Ethernet breakout module, according to embodiments of the present disclosure.

FIG. 7 depicts an overall methodology for using a Power-over-Ethernet breakout module, according to embodiments of the present disclosure. In one or more embodiments, a PoE breakout module is connected (705) to a PoE information handling system, which powers the PoE breakout module and handles data. The PoE breakout module is also connected (710) a powered device. As mentioned above, the PoE breakout module supplies (715) power to the powered device according to a configuration. As noted above, the configuration may be preset, user-selected, or dynamically set. Also, if the powered device sends or receives data traffic, the breakout model will direct data traffic accordingly.

FIG. 8 an example methodology for supplying power to one or more powered devices via a PoE breakout module, according to embodiments of the present disclosure. As a preliminary matter, electrical connections are established—electrical coupling between a PoE switch and a PoE breakout system are established and electrical coupling between a powered device and a breakout port of the PoE breakout system is also established (805). In one or more embodiments, the powered device may indicate (810) to the PoE breakout module its requested power configuration. Assuming the power management module of the POE breakout has sufficient power, it sets (815) a configuration for that port that supplied the requested power to the powered device. In one or more embodiments, in determining whether there is sufficient power, the PoE breakout module may take one or more factors into consideration.

For example, in one or more embodiments, priorities may be set that determine which powered devices receive power over other powered device, if power is limited. Examples may include user-assigned priorities, importance of device (e.g., security or critical powered devices get priority over less important devices), order of connection, whether a powered device is trusted or not, and/or preconfigured priorities (e.g., set by manufacturer). In one or more embodiments, the negotiation may include a powered device accepting a lesser amount of power than initially requested. For example, a powered device may make an initial request for its maximum power usage, but it may not need that full amount or may operate at a lower level that uses less power. Thus, the power management module may respond requesting if there is a secondary or tertiary power level that the power device would accept. If the power management module can deliver any of these power levels, it may do so. In one or more embodiments, the powered device may initially provide its primary and one or more secondary power levels.

It shall be noted that the power management module may use multiple factors, such as available power, priorities, acceptable power levels of the powered devices, trusted devices, etc. in determining how best to distribute the power among to the various breakout ports.

FIG. 9 yet another example methodology for supplying power to one or more powered devices via a PoE breakout module, according to embodiments of the present disclosure. As illustrated, a priority is assigned (905) to a powered device that is connected to a port of a PoE breakout module. In one or more embodiments, the PoE breakout module determines (910) whether there is sufficient power for the power device. If there is sufficient power, the configuration is set to supply (915) the port with power for the power device. If there is not sufficient power, the PoE breakout module determines (920) whether there are one or more powered devices connect to it, and if so, what are their assigned priorities. If there are no other powered devices attached, then the PoE breakout module simply does not have (925) sufficient power for the powered device and cannot supply it. If there are other attached powered devices, the PoE breakout module may then provide power based upon priorities. For example, if the newly attached powered device has the highest priority, the lowest priority attached powered device or devices power configurations are changed—either by reducing to a lower level or to zero or near zero—so that enough power is available (930) for the higher priority powered device or devices.

FIG. 10 yet another example methodology for supplying power to one or more powered devices via a PoE breakout module, according to embodiments of the present disclosure. In one or more embodiments, the PoE breakout module (or the power management module of the module) monitors (1005) ports of the module. Responsive to detecting (1010) that a powered device connected to a port of the PoE breakout module and responsive to detecting (1010) its requested power level, the power management module determines (1015) whether there is sufficient available power to power the newly attached powered device. If there is available power, it sets (1035) a configuration for the port to supply the requested power.

If there is not sufficient available power, it monitors (1020) to the available power to determine if more power become available. For example, an attached powered device that was receiving power may be disconnected or turned off, thereby freeing up power. In one or more embodiments, the monitoring may be done based upon schedule, continuously, based upon a triggering event (such as a powered device disconnecting), or any combination thereof.

If sufficient power becomes available, the POE breakout system may determine whether the powered device is still connected (1030). Thus, in one or more embodiments, it may be beneficial to provide a near zero power to a powered device that is not powered—which provides sufficient power to detect the presence of the powered device but not enough affect power supplied to other powered devices. In one or more embodiments, if the unpowered powered device detected as being removed, the methodology of FIG. 10 may be aborted and return to step 1005. Of course, in one or more embodiments, step 1005 may be a background process that is performed so long as one or more breakout ports are empty. Step 1005 may be performed according to schedule, continuously, based upon a triggering event (such as a powered device connecting), or any combination thereof.

If the unpowered powered device is still connected and there is now power available to supply power to it, the PoE breakout module sets (1035) a configuration for that port to supply the requested power.

D. Additional Embodiment Implementations

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A power-over-Ethernet (PoE) breakout system comprising:
 a PoE port configured to be electrically coupled to a PoE information handling system, the PoE port being configured to send and receive data and to receive power from the PoE information handling system;
 a plurality of breakout ports configured to be electrically coupled to one or more powered devices, each breakout port being configured to supply power to a powered device via the breakout port to which the powered device is electrically connected and to transmit data to the powered device and receive data from the powered device via the breakout port;
 a power management module electrically coupled to the PoE port and configured to:
  receive power from the PoE information handling system via the PoE port;
  use a portion of the received power to power the PoE breakout system;
  receive, from the powered device via a breakout port from the plurality of breakout ports, power configuration data associated with the powered device that indicates a power configuration that is requested to be supplied via the breakout port to the powered device;
  set, for the breakout port, an applied power configuration that is determined using at least the received power configuration data; and
  supply power to the powered device via the breakout port according to the applied power configuration that sets a power level for that breakout port, the supplied power being at most a portion of power received by the PoE breakout system from the PoE information handling system; and
 a data communications module communicatively coupled to the PoE port and capable of switching or routing data traffic received via the PoE port to a correct PoE breakout port according to its intended powered device and to transmit data to the PoE information handling system that is received via a PoE breakout port.

2. The power-over-Ethernet (PoE) breakout system of claim 1 wherein the applied power configuration that sets the power level for the breakout port is a preset power level.

3. The power-over-Ethernet (PoE) breakout system of claim 2 wherein at least two breakout ports of the PoE breakout system have applied power configurations that set different preset power levels.

4. The power-over-Ethernet (PoE) breakout system of claim 1 wherein the applied power configuration is dynamically set given one or more factors.

5. The power-over-Ethernet (PoE) breakout system of claim 1 wherein the PoE breakout system further comprises a console port for allowing a user to configure one or more breakout ports and wherein an applied power configuration for an identified breakout port is dynamically set by performing the step comprising:
setting a power level for the identified breakout port based upon one or more instructions received via the console port.

6. The power-over-Ethernet (PoE) breakout system of claim 1 wherein the power management module is further configured to:
determine whether power requested to be supplied to a plurality of powered devices exceeds an amount of power received via the PoE port that is allocated for powering powered devices; and
responsive to the power requested to be supplied to the plurality of powered devices exceeding the amount of power received via the PoE port that is allocated for powering powered devices, supplying power to one or more powered devices of the plurality of powered devices according to a priority assigned to the powered devices.

7. The power-over-Ethernet (PoE) breakout system of claim 6 wherein the power management module sets an applied power configuration for a powered device that, based upon its priority, does not receive power at zero or at near zero.

8. The power-over-Ethernet (PoE) breakout system of claim 1, further comprising a capacitor controller circuit for leveling power supplied to one or more of the breakout ports.

9. A method for supplying power to one or more powered device (PD) using a power-over-Ethernet (PoE) breakout system, the method comprising:
receiving power from a PoE information handling system via a PoE port;
using at least a portion of the received power to power the PoE breakout system, in which at least a portion of the remaining received power is available to be used by a power management module of the PoE breakout system to supply power to one or more breakout port of the PoE breakout system;
for a breakout port from a plurality of breakout ports for the PoE breakout system, which is connected to a powered device:
receiving, from a powered device via the breakout port, power configuration data associated with the powered device that indicates a power level that is requested to be supplied via the breakout port to the powered device;
setting, for the breakout port, an applied configuration that is determined using at least the received power configuration data; and
supplying power to the powered device, using the power management module of the PoE breakout system, via the breakout port according to the applied configuration that sets a power level supplied to the breakout port; and
responsive to receiving data traffic from the PoE information handling system via the PoE port that is intended for the powered device, using a data communications module communicatively coupled to the PoE port to direct the data traffic to the breakout port that is connected to the powered device.

10. The method of claim 9 wherein the applied configuration that sets the power level for the breakout port is a preset power level.

11. The method of claim 9 wherein at least two breakout ports of the PoE breakout system have applied configurations that set different preset power levels.

12. The method of claim 9 wherein the applied configuration is dynamically set given one or more factors.

13. The method of claim 9 wherein the PoE breakout system further comprises a console port for allowing a user to configure one or more breakout ports and wherein an applied configuration for an identified breakout port is dynamically set by performing the step comprising:
setting a power level for the identified breakout port based upon one or more instructions received via the console port.

14. The method of claim 9 further comprising:
determining, via the power management module, whether power requested to be supplied to a plurality of powered devices exceeds the remaining received power that is allocated for powering powered devices, wherein each powered device is connected to the PoE breakout system via a respective breakout port of the PoE breakout system; and
responsive to the power requested to be supplied to the plurality of powered devices exceeding the remaining received power that is allocated for powering powered devices, supplying power to one or more powered devices of the plurality of powered devices according to a priority assigned to the powered devices.

15. The method of claim 14 further comprising:
for a powered device that, based upon its priority does not receive power, setting its applied configuration power level to zero or near zero.

16. The method of claim 9 further comprising:
monitoring an amount of the remaining received power that is available to be supplied to one or more powered devices; and
responsive to power being available for powering a powered device:
detecting whether a second powered device that is not receiving power is connected to the PoE breakout system via a breakout port; and
responsive to a power level to be supplied to the breakout port being equal to or less than the amount of the remaining received power that is available, supplying power to the second powered device via its breakout port.

17. The method of claim 9 further comprising:
using a capacitor controller circuit to provide power leveling to one or more of the breakout ports of the PoE breakout system.

18. A Power-over-Ethernet (PoE) breakout system comprising:
a PoE port, for electrically coupling to a PoE information handling system, to facilitate communication of data to and from the PoE information handling system and to receive power from the PoE information handling system;

a plurality of breakout ports configured to be electrically coupled to a powered device, each breakout port being configured to supply power to the powered device and to transmit data to the powered device and receive data from the powered device via the breakout port; and a power management module configured to:
  receive power from the PoE information handling system via the PoE port;
  use a portion of the received power to power the PoE breakout system;
  receive, from a first powered device via a first breakout port, power configuration data associated with the first powered device that indicates a first power configuration that is requested to be supplied via the breakout port to the first powered device;
  set, for the first breakout port, the first applied power configuration that is determined using at least the received power configuration data; and
  supply a first portion of the power received from the PoE information handling system to the first powered device via the first breakout port in accordance with the first applied power configuration.

19. The PoE breakout system of claim 18, wherein the first applied power configuration is user-set, dynamically set, or preset.

20. The PoE breakout system of claim 18, further comprising:
  a data communications module communicatively coupled to the PoE port and capable of switching or routing data traffic received via the PoE port to a correct breakout port according to its intended powered device and to transmit data to the PoE information handling system that is received via a breakout port.

* * * * *